United States Patent
Roovers

(10) Patent No.: US 8,155,302 B2
(45) Date of Patent: Apr. 10, 2012

(54) ACOUSTIC ECHO CANCELLER

(75) Inventor: David A. C. M. Roovers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 947 days.

(21) Appl. No.: 12/159,634

(22) PCT Filed: Jan. 3, 2007

(86) PCT No.: PCT/IB2007/050011
§ 371 (c)(1),
(2), (4) Date: Jun. 30, 2008

(87) PCT Pub. No.: WO2007/077536
PCT Pub. Date: Jul. 12, 2007

(65) Prior Publication Data
US 2008/0304675 A1 Dec. 11, 2008

(30) Foreign Application Priority Data
Jan. 6, 2006 (EP) .................................. 06100125

(51) Int. Cl.
*H04M 9/08* (2006.01)
(52) U.S. Cl. ......... 379/406.05; 379/406.14; 379/406.13; 381/66; 381/93; 381/94.2
(58) Field of Classification Search .............. 381/66
See application file for complete search history.

(56) References Cited

U.S. PATENT DOCUMENTS

| 5,131,032 A | | 7/1992 | Esaki et al. | |
|---|---|---|---|---|
| 5,631,899 A | * | 5/1997 | Duttweiler | 370/291 |
| 5,818,945 A | * | 10/1998 | Makino et al. | 381/66 |
| 6,147,979 A | * | 11/2000 | Michel et al. | 370/292 |
| 6,546,099 B2 | | 4/2003 | Janse | |
| 6,556,682 B1 | * | 4/2003 | Gilloire et al. | 381/66 |
| 2002/0159585 A1 | | 10/2002 | Janse | |
| 2004/0264686 A1 | | 12/2004 | Enzner | |
| 2006/0008076 A1 | * | 1/2006 | Okumura et al. | 379/406.01 |
| 2006/0222172 A1 | * | 10/2006 | Chhetri et al. | 379/406.05 |

FOREIGN PATENT DOCUMENTS

| EP | 0301627 A1 | 2/1989 |
|---|---|---|
| WO | 0169810 A2 | 9/2001 |

OTHER PUBLICATIONS

Oguz Tanrikulu, et al: A New Non-Linear Processor (NLP) for Background Continuity in Echo Control, ICASSP 2003, IEEE 2003, V-588-591.

* cited by examiner

*Primary Examiner* — Matthew Landau
*Assistant Examiner* — Khaja Ahmad

(57) ABSTRACT

An acoustic echo cancellation device for canceling an echo in a microphone signal in response to first and second input signals includes a first combination unit for combining the first and second input signals into an aggregate input signal. The device further includes an adaptive filter unit for filtering the aggregate input signal so as to produce an aggregate echo cancellation signal. A second combination unit combines the aggregate echo cancellation signal with the microphone signal so as to produce a residual signal, and an additional filter unit filters either the first or second input signal so as to produce a first or a second partial echo cancellation signal. A post-processor unit suppresses remaining echo components in the residual signal. The post-processor unit uses at least one partial echo cancellation signal to suppress echo components corresponding with the first input signal to a greater extent than echo components corresponding with the second input signal.

14 Claims, 5 Drawing Sheets

ACOUSTIC ECHO CANCELLER

FIELD OF THE INVENTION

The present invention relates to an acoustic echo canceller. More in particular, the present invention relates to an acoustic echo cancellation device for canceling an echo in a microphone signal in response to a far-end signal, the device comprising an adaptive filter unit arranged for filtering the far-end signal so as to produce an echo cancellation signal, a combination unit arranged for combining the echo cancellation signal with the microphone signal so as to produce a residual signal, and a post-processor unit arranged for substantially removing any remaining echo components from the residual signal.

BACKGROUND OF THE INVENTION

Echo cancellation devices are well known. When a loudspeaker and a microphone are positioned close together and used simultaneously, as in (hands-free) telephones, part of the far-end signal appears as an echo in the microphone signal. A typical echo cancellation device comprises an adaptive filter that models the acoustic path between the loudspeaker rendering the far-end signal and the microphone receiving both the echo and the near-end signal. If the echo cancellation signal produced by the adaptive filter is equal to the echo in the microphone signal, the echo can be cancelled out and only the near-end signal remains. However, the residual signal resulting from combining the microphone signal and the echo cancellation signal typically still contains echo components. To remove such echo components, a post-processor may be used to further process the residual signal and remove any remaining echo components. The post-processor unit typically provides a time and frequency dependent gain function that selectively attenuates those frequencies at which a significant residual far-end echo is present.

U.S. Pat. No. 6,546,099 (Philips) discloses an acoustic echo cancellation device which includes a post-processor. This Prior Art echo cancellation device further includes a spectrum estimator for determining the frequency spectrum of the echo cancellation signal. The post-processor comprises a filter which is dependent on the frequency spectrum of the echo cancellation signal. The use of such a post-processor significantly improves the suppression of the remaining echo in the residual signal.

The arrangement known from U.S. Pat. No. 6,546,099 performs well in most cases. However, in some circumstances the remaining echo cannot be sufficiently suppressed without suppressing or distorting the near-end signal. This may be the case in a so-called double-talk situation, where far-end speech and near-end speech are simultaneously received by the microphone, especially when the far-end speech is relatively loud. In modern mobile (cellular) telephone apparatus this is often the case as the loudspeaker and the microphone are located very close together. When used in hands-free mode, the far-end echo may be much louder than the near-end signal, causing Prior Art echo cancellation devices to introduce audible signal distortions.

This problem is aggravated when the echo is not only caused by the far-end signal but also by an additional signal, such as a music signal or a second far-end signal. Modern mobile telephone apparatus, for example, are often capable of reproducing music downloaded from the Internet, for example music stored in MP3 format or a similar format. When this music is reproduced during a telephone call, a situation of continuous double-talk results. Prior Art acoustic echo cancellation devices fail to offer a solution to this problem.

SUMMARY OF THE INVENTION

It is an object of the present invention to overcome these and other problems of the Prior Art and to provide an acoustic echo cancellation device capable of dealing with multiple input signals, such as a far-end speech signal and a music signal.

Accordingly, the present invention provides an acoustic echo cancellation device for canceling an echo in a microphone signal in response to a first input signal and a second input signal, the device comprising:

a first combination unit arranged for combining the first input signal with the second input signal into an aggregate input signal, an adaptive filter unit arranged for filtering the aggregate input signal so as to produce an aggregate echo cancellation signal, a second combination unit arranged for combining the aggregate echo cancellation signal with the microphone signal so as to produce a residual signal, an additional filter unit arranged for filtering either the first input signal or the second input signal so as to produce a first partial echo cancellation signal or a second partial echo cancellation signal respectively, and a post-processor unit arranged for substantially suppressing remaining echo components in the residual signal, wherein the post-processor unit is arranged for utilizing at least one partial echo cancellation signal to suppress echo components corresponding with the first input signal to a greater extent than echo components corresponding with the second input signal.

By combining the input signals into an aggregate input signal and using the aggregate input signal in the adaptive filter, the filter is able to provide a reliable model of the echo path of both input signals. Using the aggregate input signal in the adaptive filter has the additional advantage that there is an increased likelihood of a signal being fed to the adaptive filter at any time, so that its filter coefficients will remain up to date.

By providing an additional filter unit arranged for filtering one of the input signals, a partial echo cancellation signal is produced that is related to one of the input signals only. Such a partial echo cancellation signal may be used to selectively suppress remaining echo components (or echoes). In accordance with the present invention, echo components corresponding with the first input signal are suppressed to a greater extent than echo components of the second input signal. As a result of this selective suppression of the remaining echo components by the post-processor, it is possible to suppress the echo components of the first input signal substantially completely while suppressing the echo components of the second input signal only partially or not at all.

It is noted that the first input signal may be a far-end signal, for example the speech signal produced by a remote telephone apparatus, while the second input signal may be a music signal, for example the music signal produced by a mobile telephone apparatus in which the acoustic echo cancellation device is incorporated. This would make it possible to substantially remove the far-end echo while leaving at least part of the remaining music echo in the residual signal, and therefore in the output signal of the device.

It is also possible for the second input signal to be ring tone signal or a streaming audio signal, for example originating from another remote telephone apparatus or other remote or local source. It will be understood that the present invention is not limited to two input signals and that three or more input signals may be combined into an aggregate input signal.

As stated above, a partial echo cancellation signal is used to suppress echo components from the first input signal to a greater extent than echo components from the second input signal. That is, the first input signal echo components may be suppressed substantially entirely, and at least partially, while the second input echo signal components may not be suppressed at all. The partial echo cancellation signal used to this end preferably is the first partial echo cancellation signal associated with the first input signal. This first partial echo cancellation signal may be derived directly from the first input signal, or from the second partial echo cancellation signal and the aggregate echo cancellation signal.

In a preferred embodiment, therefore, the additional filter unit is arranged for filtering the second input signal so as to produce the second partial echo cancellation signal, while the acoustic echo cancellation device further comprises a third combination unit arranged for combining the aggregate echo cancellation signal and the second partial echo cancellation signal so as to produce the first partial echo cancellation signal. In this embodiment, therefore, the first partial echo cancellation signal is derived indirectly. It will be understood that the third combination unit, as the second combination unit, may perform a subtraction.

In a typical embodiment the post-processor unit will receive the first partial echo cancellation signal from the additional filter unit or the third combination unit. However, in alternative embodiments, the third combination unit is integrated in the post-processor unit, allowing the post-processor unit to receive the second partial echo cancellation signal and the aggregate echo cancellation signal instead of the first partial echo cancellation signal.

The additional filter unit may comprise an adaptive filter unit. Preferably, the additional filter unit is coupled to the adaptive filter unit so as to share filter coefficients. This coupling allows the additional filter unit to copy all or part of the coefficients of the (main) adaptive filter unit. The (main) adaptive filter unit and the additional filter unit may share a filter coefficients determination unit.

The device of the present invention may advantageously be arranged for receiving at least one input signal which itself is a multiple (or composite) input signal, such as a stereo music signal, a 5.1 music signal, or a stereo speech signals. In such embodiments, the total number of input signals is at least three. To process such these input signals, the device of the present invention may advantageously comprise fifth combination units for producing an aggregate sum input signal and an aggregate difference input signal, adaptive filters for filtering the aggregate sum input signal and the aggregate difference input signal respectively, and a sixth combination unit coupled to the adaptive filters for producing the echo cancellation signal. That is, both the sum signal and the difference signal are processed by a separate adaptive filter.

The device of the present invention may advantageously further comprise a signal adaptation unit arranged for receiving an input signal and producing an adapted input signal, and a fourth combination unit for combining the adapted input signal and the output signal of the post-processor. By adding an adapted version of an input signal to the output signal, distortions and undesired side-effects are further reduced while any "gating" is prevented.

Such a signal adaptation unit may also be used in acoustic echo cancellation devices having only a single input signal.

The signal adaptation unit may comprise a delay unit, an amplifier unit and/or a filter unit. The amplifier unit preferably has a variable gain.

The present invention also provides a method of canceling an echo in a microphone signal in response to a first input signal and a second input signal, the method comprising the steps of:
 combining the first input signal with the second input signal into an aggregate input signal,
 filtering the aggregate input signal so as to produce an aggregate echo cancellation signal,
 combining the aggregate echo cancellation signal with the microphone signal so as to produce a residual signal,
 filtering either the first input signal or the second input signal so as to produce a first partial echo cancellation signal or a second partial echo cancellation signal respectively, and
 substantially suppressing remaining echo components in the residual signal,
 wherein the step of suppressing remaining echo components involves utilizing at least one partial echo cancellation signal to suppress echo components corresponding with the first input signal to a greater extent than echo components corresponding with the second input signal.

Further method claims will become apparent from the description below.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

BRIEF DESCRIPTION OF THE DRAWINGS

The present invention will further be explained below with reference to exemplary embodiments illustrated in the accompanying drawings, in which.

DESCRIPTION OF PREFERRED EMBODIMENTS

Figure 1:
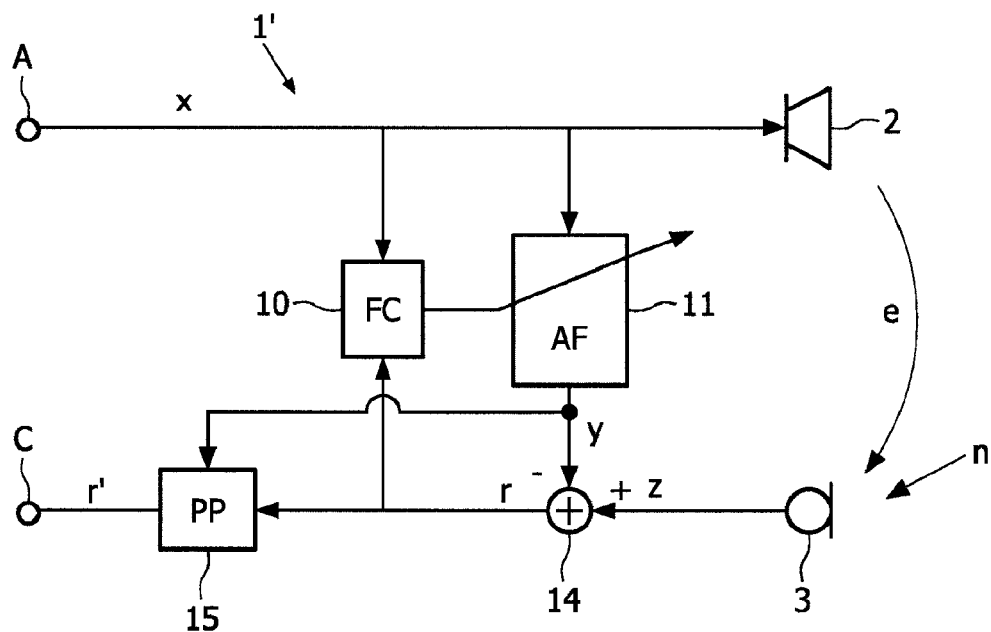
FIG. 1 schematically shows an acoustic echo cancellation device according to the Prior Art.

The acoustic echo cancellation device 1' according to the Prior Art shown schematically in FIG. 1 comprises an adaptive filter (AF) unit 11, a filter coefficients (FC) unit 10, a combination unit 14 and a post-processor (PP) unit 15. The device 1' may further comprise a D/A (digital/analog) converter, an A/D (analog/digital) converter, an amplifier and/or other components which are not shown in FIG. 1 for the sake of clarity of the illustration.

A input signal x is received at the input terminal A of the device 1'. The input signal x, which typically is a remotely produced so-called far-end signal, is fed to a loudspeaker 2 which converts this signal into sound. Part of this sound is received by the microphone 3 as an acoustic echo e. The microphone 3 also receives the acoustic near-end sound n and converts the combination of the echo e and the near-end sound n into a microphone signal z, which is fed to the combination unit 14.

The input signal x is also fed to the adaptive filter unit 11 and the associated filter coefficients unit (or filter update) unit 10. The filter coefficients unit 10 also receives the residual signal r and typically sets the coefficients of the adaptive filter 11 such that the correlation between the signals x and r is minimal.

The adaptive filter unit 11 filters the input signal x and produces an echo cancellation signal y that ideally is equal to the echo component of the microphone signal z. The microphone signal z and the echo cancellation signal y are combined in the combination unit 14, which in the present example is constituted by an adder. The echo cancellation signal y is added with a negative sign and is therefore subtracted from the microphone signal z, yielding the residual signal r.

Although the residual signal r ideally contains no echo components, in practice some echo components will remain. For this reason a post-processor 15 is added, which further processes the residual signal r to yield a processed residual signal r'. The processed residual signal r' output by the post-processor unit 15 is fed to the output terminal C of the device 1'.

The post-processor 15 also receives the echo cancellation signal y to further process the residual signal r in dependence of the signal y. A suitable processing operation is spectral subtraction, where the absolute value $|R'(\omega)|$ of the frequency spectrum of the processed residual signal r' is, for example, determined by the relationship:

$$|R'(\omega)|=|R(\omega)|-\gamma\cdot|Y(\omega)| \quad (1)$$

where $|R(\omega)|$ and $|Y(\omega)|$ are the absolute values of the frequency spectra of the signals r and y respectively, and where $\gamma$ is an over-subtraction parameter. Spectral subtraction or similar techniques may be carried out directly, in accordance with equation (1), or may be used to determine a gain function the residual signal r is multiplied with, for example:

$$G(\omega) = \max\left\{G_{min}(\omega), \frac{|Z(\omega)| - \gamma \cdot |Y(\omega)|}{|R(\omega)|}\right\} \quad (2)$$

where $G(\omega)$ is the (frequency-dependent) gain function of the post-processor, $G_{min}(\omega)$ is a minimum gain value, $|Z(\omega)|$ is the absolute value of the frequency spectrum of the microphone signal z, $\gamma$ is the over-subtraction parameter, $|Y(\omega)|$ is the absolute value of the frequency spectrum of the echo cancellation signal y, and $|R(\omega)|$ is the absolute value of the frequency spectrum of the residual signal r. Typically, $\gamma$ is chosen to be greater than 1, for example 1.2, 1.5, 1.8, or 2.0. The signal z may be determined using the relationship z=y+r.

Post-processing operations of this type are described in more detail in U.S. Pat. No. 6,546,099 referred to above.

It has been found that in some circumstances, the quality of the output signal r' produced by the Prior Art device 1' illustrated in FIG. 1 is not satisfactory. When a (mobile or wireless) telephone handset is used in hands-free mode, for example, the echo e may be much louder than the near-end sound n, especially when the person speaking is relatively far away from the handset. As a result, the near-end signal will be largely suppressed by the device 1'. The echo cancellation signal y will be almost equal to the microphone signal z and any remaining components of the near-end signal are attenuated by the post-processor. The resulting output signal r' will therefore be distorted.

Figure 2:
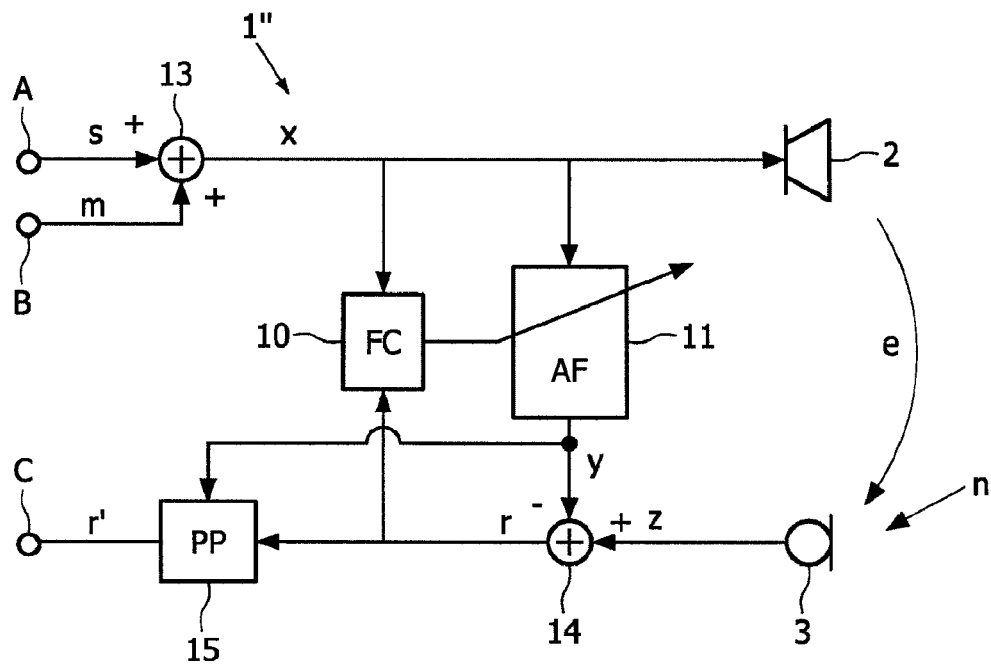
FIG. 2 schematically shows an acoustic echo cancellation device arranged for receiving two input signals.

This problem is aggravated when a second input signal is present. This is schematically shown in FIG. 2 where the device 1'' comprises, in addition to the components discussed with reference to FIG. 1, a further combination unit 13 and an additional input terminal B. At the first input terminal A, the device 1'' receives a first input signal s (for example a far-end speech signal), while a second input signal m (for example a music signal) is received at the second input terminal B. These input signals s and m are combined (for example added) at the combination unit 13 to produce a combined or aggregate input signal x. This aggregate signal x is then rendered and processed as in the device 1' of FIG. 1.

The device 1'' of FIG. 2, however, has the disadvantage that the probability of a so-called double-talk situation is greatly increased, as there are now two input signals that can be rendered by the loudspeaker when near-end sound (for example speech) n is present. In particular when the second input signal m comprises music, which can sound for minutes without interruption, double-talk is highly likely. As discussed above, double-talk situations are likely to lead to distortion of the near-end signal n as the post-processor attempts to remove the relatively loud echo e. Accordingly, the performance of the device 1'' of FIG. 2 is not satisfactory.

The present invention solves this problem by suitably controlling the post-processor in dependence of at least one of the input signals, so as to provide a selective attenuation of the echo components caused by the respective input signals.

Figure 3:
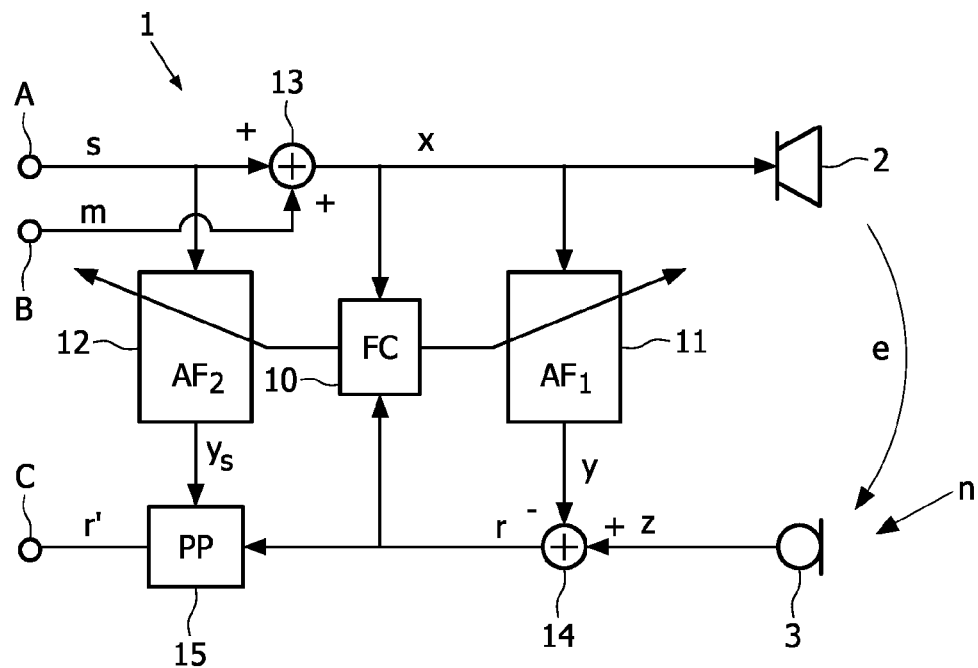
FIG. 3 schematically shows a first embodiment of an acoustic echo cancellation device according to the present invention.

The acoustic echo cancellation device 1 according to the present invention shown merely by way of non-limiting example in FIG. 3 also comprises an adaptive filter (AF$_1$) unit 11, a filter coefficients (FC) unit 10, a first combination unit 13, a second combination unit 14, and a post-processor (PP) unit 15. In addition, the device 1 of the present invention comprises a second adaptive filter (AF$_2$) unit 12.

It will be clear to those skilled in the art that the device 1 may further comprise an amplifier, a D/A (digital/analog) converter, an A/D (analog/digital) converter, one or more band pass filters, and other components which are not shown in FIG. 3 for the sake of clarity of the illustration.

While the first adaptive filter unit 11 receives the aggregate input signal x, the second adaptive filter unit 12 receives only one of the input signals, in the example of FIG. 3 the first input signal s, and produces a partial echo cancellation signal, in the present example the (first) partial echo cancellation signal $y_s$. In the embodiment of FIG. 3, the partial echo cancellation signal $y_s$ instead of the aggregate echo cancellation signal y is fed to the post-processor 15. As a result, the post-processor 15 is capable of processing the residual signal r solely on the basis of the first input signal s, independently of the second input signal m. In case the post-processor 15 uses a gain function, this function can be written as:

$$G(\omega) = \max\left\{G_{min}(\omega), \frac{|Z(\omega) - \gamma_s \cdot |Y_s(\omega)||}{|R(\omega)|}\right\} \quad (3)$$

where $G(\omega)$ is the (frequency-dependent) gain function of the post-processor, $G_{min}(\omega)$ is a minimum gain value, $|Z(\omega)|$ is the absolute value of the frequency spectrum of the microphone signal z, $\gamma_s$ is a weighting factor (or over-subtraction parameter), $|Y_s(\omega)|$ is the absolute value of the frequency spectrum of the partial echo cancellation signal $y_s$, and $|R(\omega)|$ is the absolute value of the frequency spectrum of the residual signal r. Typically, $\gamma_s$ is chosen to be greater than 1, for example 1.2, 1.5, 1.8, or 2.0. The microphone signal z may be fed to the post-processor 15 but is preferably derived in the post-processor using the relationship z=r+y.

It is noted that the gain function $G(\omega)$, or its equivalent, is preferably determined per frequency bin, each frequency bin corresponding to a narrow frequency range.

In the exemplary embodiment of FIG. 3, the filter 12 is a (second) adaptive filter ($AF_2$) which is coupled to the filter coefficients (FC) unit 10, and hence to the (first) adaptive filter ($AF_1$) 11. In this arrangement, the (second) filter 12 receives its filter coefficients from the adaptive filter unit constituted by the filter coefficients unit 10 and the (first) adaptive filter 11. As the first filter 11 models the echo path between the loudspeaker 2 and the microphone 3, the second filter 12 will do the same. Those skilled in the art know that the filter coefficients unit 10 typically attempts to minimize the correlation between the aggregate input signal x and the residual signal r so as to optimally model the echo path. It is noted that the second adaptive filter 12 may, in some embodiments, have a shorter filter length than the first filter 11 and may therefore receive only a subset of the filter coefficients, for example the first n coefficients, where n may be 10, 20, 25, 30 or any other suitable number.

As discussed above, in the inventive acoustic echo cancellation device 1 illustrated in FIG. 3 distortion of the residual signal is reduced or eliminated by selective post-processing, using only the partial echo cancellation signal $y_s$, as the (possibly relatively loud) second signal m would cause the post-processor to introduce too much attenuation. It has been found, however, that the output signal r' can be even further improved by allowing some post-processing (such as attenuation) on the basis of the second signal m, provided this additional post-processing is limited in extent. If the post-processing involves attenuation, the post-processor would introduce less attenuation based on the second input signal than on the first input signal. By selecting the amount of attenuation (or its equivalent) based upon the second input signal, a trade-off can be made between suppression of the second signal and the risk of distortion.

A suitable gain function involving a second partial echo cancellation signal $y_m$ is:

$$G(\omega) = \max\left\{G_{min}(\omega), \frac{|Z(\omega) - \gamma_s \cdot |Y_s(\omega)| - \gamma_m \cdot |Y_m(\omega)||}{|R(\omega)|}\right\} \quad (4)$$

where $G(\omega)$, $G_{min}(\omega)$, $|Z(\omega)|$, $\gamma_s$, $|Y(\omega)|$, and $|R(\omega)|$ are defined as before, $\gamma_m$ is the weighting factor (over-subtraction parameter) applied to the second echo cancellation signal $y_m$, and $|Y_m(\omega)|$ is the absolute value of the frequency spectrum of the second echo cancellation signal $y_m$. In accordance with the present invention, the first weighting factor $\gamma_s$ is chosen to be larger than the second weighting factor $\gamma_m$. For example, $\gamma_s$ may be approximately equal to 1.8 while $\gamma_m$ is approximately equal to 0.9. It will be understood that other values are also possible. In a typical embodiment, the first weighting factor $\gamma_s$ may range from 1.0 to 2.0, while the second weighting factor $\gamma_m$ may range from 0.3 to 1.1, subject to the relationship $\gamma_m \leq \gamma_s$.

The value of $G_{min}(\omega)$ may be fixed or variable. A suitable fixed value of $G_{min}(\omega)$ is zero and serves to prevent negative gain values, while a suitable variable value of $G_{min}(\omega)$ may be determined using:

$$G_{min} = G_0 \cdot \frac{|Y_m(\omega)|}{|Y_m(\omega)| + |Y_s(\omega)|} \quad (5)$$

where $G_0$ is the gain when $y_s$ is equal to zero, a suitable value being 0.25, 0.5 or 1.0, although other values may also be used.

Figure 4:
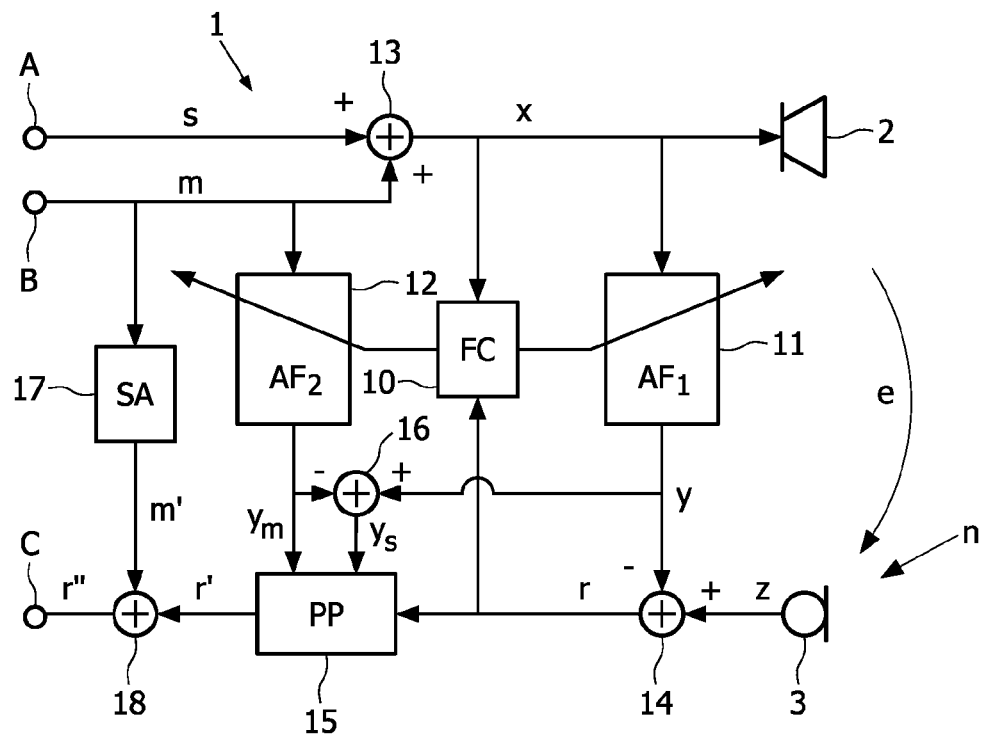
FIG. 4 schematically shows a second embodiment of an acoustic echo cancellation device according to the present invention.

An exemplary embodiment of an acoustic echo cancellation device according to the present invention in which two partial echo cancellation signals are used is illustrated in FIG. 4. The embodiment of FIG. 4 also comprises a filter coefficients (FC) unit 10, a first adaptive filter ($AF_1$) unit 11, a second adaptive filter ($AF_2$) unit 12, a first combination unit 13, a second combination unit 14, and a post-processor (PP) unit 15. In addition, the device 1 of FIG. 4 comprises a third combination unit 16, a signal adaptation (SA) unit 17, and a fourth combination unit 18.

In the embodiment of FIG. 4, the second adaptive filter 12 receives the second input signal m instead of the first input signal s. As a result, the filter 12 produces the second echo cancellation signal $y_m$, which is fed to the post-processor 15. The third combination unit 16 serves to derive the first echo cancellation signal $y_s$ from the aggregate echo cancellation signal y and the second echo cancellation signal $y_m$ using the relationship $y_s = y - y_m$. The first echo cancellation signal $y_s$ is also fed to the post-processor 15 to be used for selective processing, for example selective attenuation using formula (4) above.

It is noted that the third combination unit 16 could be incorporated in the post-processor 15, in which case the post-processor only receives the signals y and $y_m$. Similarly, in the embodiment of FIG. 3, the post-processor 15 could receive the signals $y_s$ and y, and derive the signal $y_m$.

The signal adaptation unit 17 receives the second input signal m and feeds a delayed, attenuated and/or filtered version m' of this input signal to the fourth combination unit 18. This unit 18 then combines (typically: adds) the adapted second input signal m' and the processed residual signal r' to produce an enhanced residual signal r". By adding part of the second input signal m to the output signal, any distortions of the second input signal are masked by the added signal m'. The operation of the signal adaptation unit 17 will later be explained in more detail with reference to FIG. 7.

It is preferred that the first input signal s is a speech signal, such as a far-end speech signal, while the second input signal m is a music signal, for example a music signal produced by an MP3 player or a similar device. However, the present invention is not so limited and both input signals could be speech signals, or music signals. In addition, a third input signal could be received at a third input terminal, and a third partial echo cancellation may be derived if required. Those skilled in the art will readily be able to adapt the device of the present invention accordingly.

Figure 5:
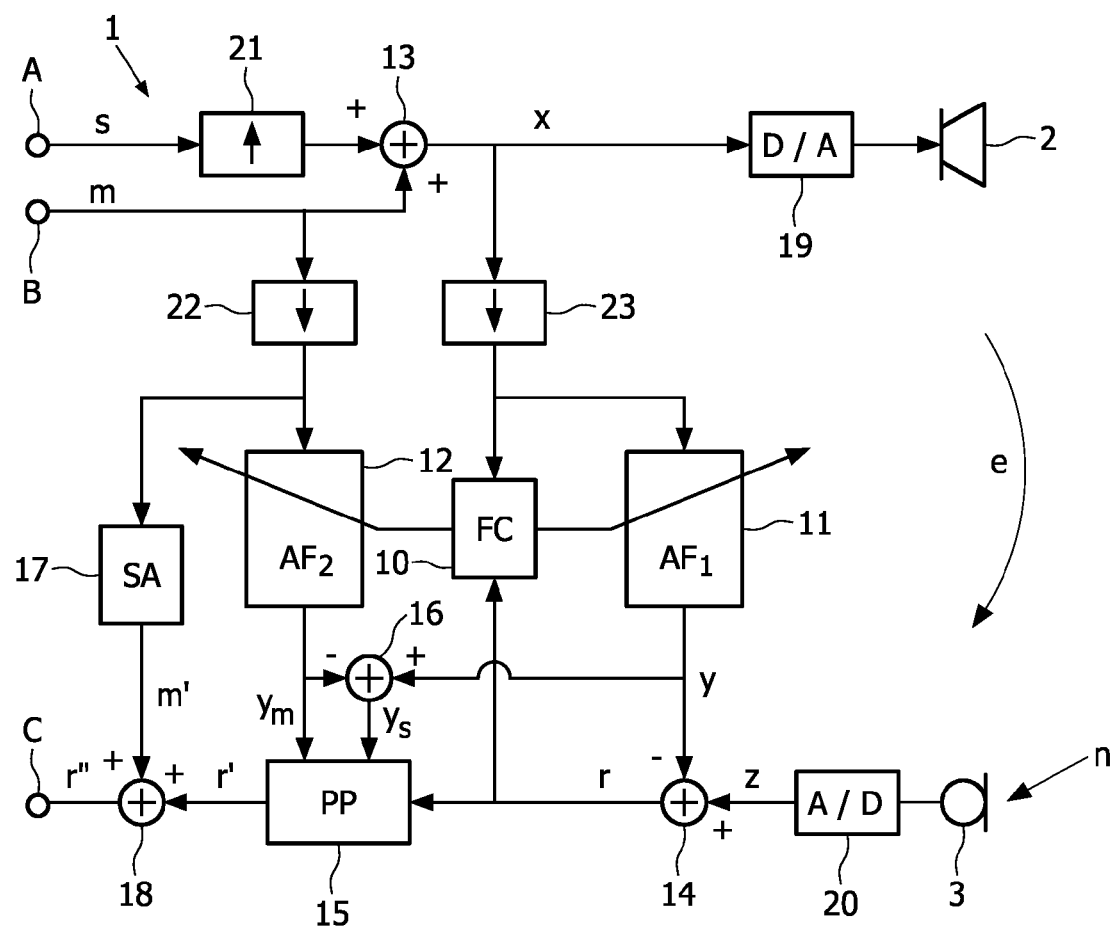
FIG. 5 schematically shows a third embodiment of an acoustic echo cancellation device according to the present invention.

The embodiment illustrated in FIG. 5 is based upon the embodiment of FIG. 4 to which an upsampler 21 and downsamplers 22 and 23 have been added. In addition, a digital/analog (D/A) converter 19 and an analog/digital (A/D) converter 20 are shown. In this embodiment, it is assumed that the first input signal s is a (e.g. speech) signal sampled at 8 kHz, while the second input signal m is a (e.g. music) signal sampled at 48 kHz. The upsampler 21 converts the sampling frequency of the first input signal s from 8 kHz into 48 kHz, which allows the input signals s and m to be combined in the first combination unit 13. If the output signal r" of the device 1 is to have a sampling frequency of 8 kHz, and/or if it is desired to use a 8 kHz sampling frequency in the adaptive filters, downsamplers 22 and 23 have to be provided to convert the sampling frequency of the second input signal m and the aggregate input signal x from 48 kHz into 8 kHz. It will be understood that the sampling frequencies mentioned are given by way of example only and that other sampling frequencies may be used.

The D/A converter 19 converts the digital aggregate input signal x into an analog signal which is fed to the loudspeaker 2. An amplifier (not shown) may optionally be arranged between the D/A converter 19 and the loudspeaker 2. The A/D converter 20 converts the analog microphone signal into a digital signal.

In the embodiments discussed above each input signal is a mono (that is, single channel) signal. The present invention, however, is not so limited and may also be applied when multiple channel input signals are offered. An exemplary embodiment of an acoustic echo cancellation device capable of receiving a stereo input signal is illustrated in FIG. 6.

Figure 6:
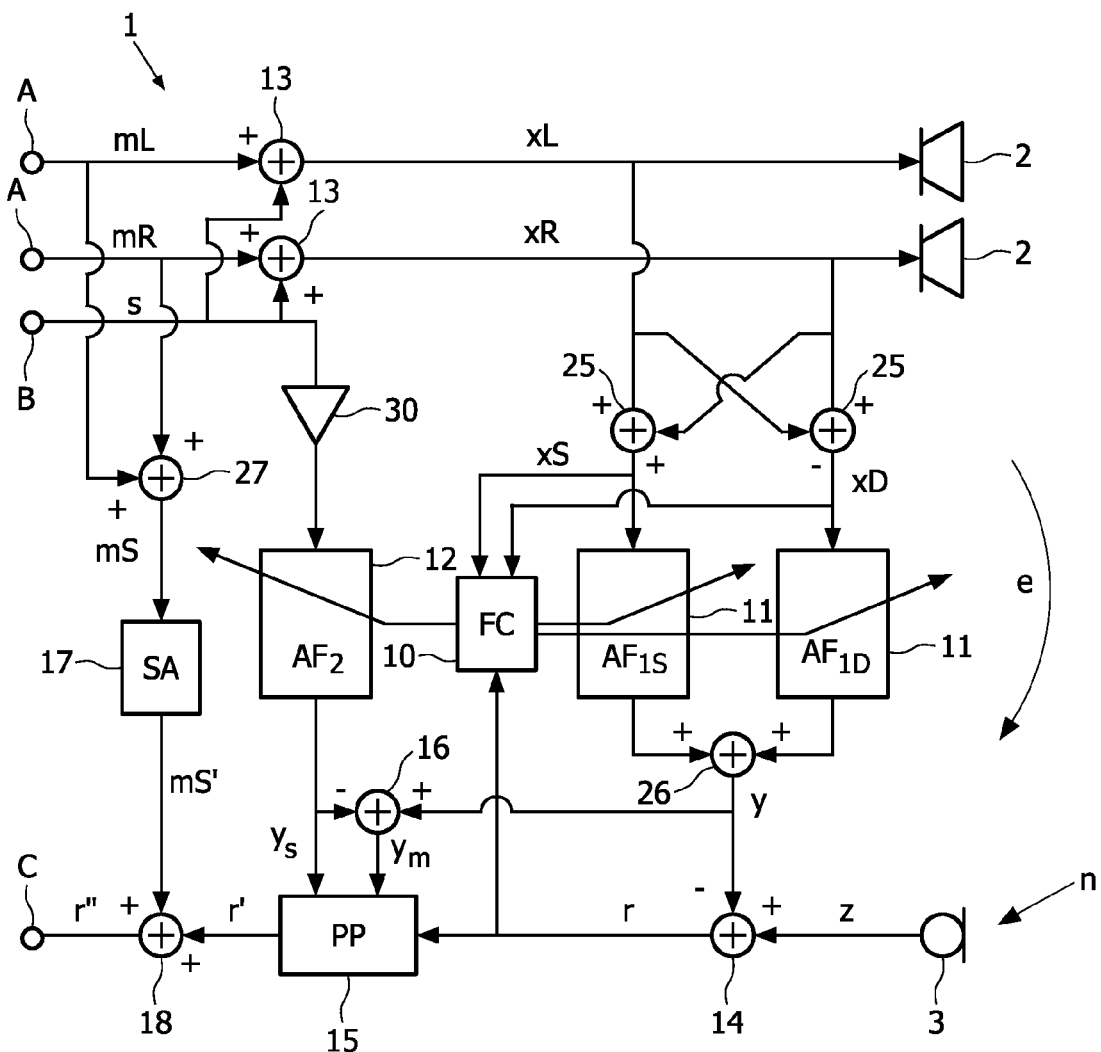
FIG. 6 schematically shows a fourth embodiment of an acoustic echo cancellation device according to the present invention.

The exemplary embodiment of FIG. 6 is largely identical to the embodiment of FIG. 4 and comprises a filter coefficients (FC) unit 10, first adaptive filter ($AF_{1S}$, $AF_{1D}$) units 11, a second adaptive filter ($AF_2$) unit 12, a first combination unit 13, a second combination unit 14, a post-processor (PP) unit 15, a third combination unit 16, an optional signal adaptation (SA) unit 17 and an optional fourth combination unit 18.

In the embodiment of FIG. 6, a single input terminal B receives the first input signal s while two input terminals A receive a left second input signal mL and a right second input signal mR. Two first combination units 13 combine the first input signal s and the second input signals mL and mR to produce left aggregate input signal xL and right aggregate input signal xR respectively. The aggregate input signals xL and xR are each fed to a respective loudspeaker 2 and a respective (fifth) combination unit 25. The combination units 25 combine the two signals xL and xR, the left unit producing the sum signal xS and the right unit producing the difference signal xD. These aggregate sum and difference input signals xS and xD are fed to a sum ($AF_{1S}$) and a difference ($AF_{1D}$) adaptive filter 11 respectively, the output signals of which are combined in a (sixth) combination unit 26 to produce the aggregate echo compensation signal y.

The sum signal xS and the difference signal xD are also fed to the filter coefficients (FC) unit 10 so that both signals can be used to produce the coefficients of the adaptive filters 11 and 12.

The input signals mL and mR are combined in a (seventh) combination unit 27 which produces a sum signal mS which is fed to the (optional) signal adaptation unit 17. The output signal mS' of the signal adaptation unit 17 is fed to the (fourth) combination unit 18 to be combined with the processed residual signal r'. It is noted that the sum signal mS is derived by combining the (second) input signals mL and mR and does not contain the first input signal s, while the sum signal xS is derived by combining all input signals, that is mL, mR and s. An amplification unit 30 coupled between the input terminal B and the (second) adaptive filter 12 serves to multiply the level of the first input signal s by a factor equal to 2 in order to compensate for the fact that the signal s appears as 2.s in the aggregate input sum signal xS.

It can thus be seen that the acoustic echo cancellation device of the present invention may be modified to receive multi-channel input signals. An aggregate input signal (sum signal xS) is produced which is used by the filter coefficients unit 10.

Figure 7:
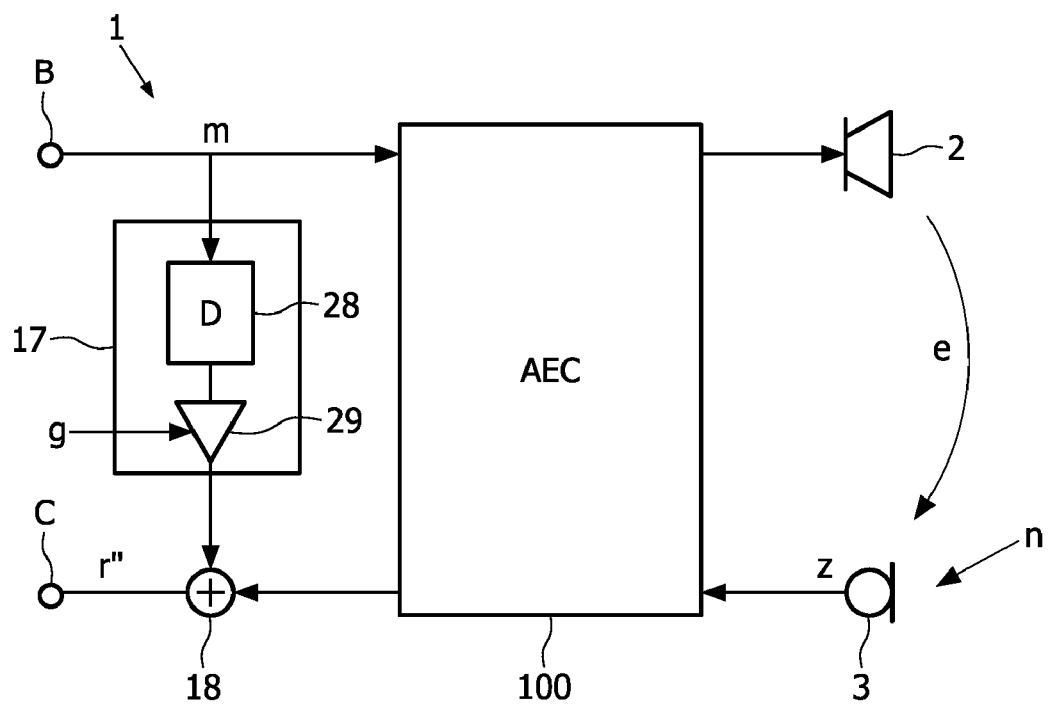
FIG. 7 schematically shows a fifth embodiment of an acoustic echo cancellation device according to the present invention.

In the embodiment of FIG. 7, the body of the acoustic echo cancellation (AEC) device 1 is represented with a single unit 100 for the sake of clarity, and only the signal adaptation unit 17 and the (fourth) combination unit 18 are shown separately. The AEC unit 100 may comprise, for example, the units 10-16 of FIG. 4, or only the units 10, 11, 14 and 15 of FIG. 1. In the embodiment of FIG. 7, only a single input signal m is present, which may be a music signal but is not so limited.

The signal adaptation unit 17 schematically illustrated in FIG. 7 comprises a delay unit 28 and a (controlled) amplifier 29. The delay unit 28 compensates the delay introduced by the second adaptive filter 12 and the post-processor 15. The amplifier 29 amplifies or attenuates the signal m (or x) to a certain extent. The gain of the amplifier 29 can preferably be controlled (adjustable gain g). The signal adaptation unit may further comprise one or more band-pass filters (not shown) for selecting frequency bands of the input signal m.

The signal adaptation unit 17 serves to add an adapted version of the input signal to the output signal of the acoustic echo cancellation device. This re-addition of the input signal reduces tonal artifacts and masks any "gating" caused by the post-processor. Those skilled in the art will realize that "gating" or the occurrence of interruptions in the output signal is caused by double-talk when the input signal causes the gain function of the post-processor to assume a low value.

More in particular, the input signal may not, or not completely, be suppressed by the adaptive filter and the post-processor, as may be the case for the second input signal m in the exemplary embodiments of FIGS. 3-7. Any remaining (second) input signal causes a deterioration of the output signal, as it may contain reverberations only, be non-linear, and typically may be suppressed completely when a near-end signal is present (gating). By adding an input signal that is not completely suppressed to the output signal, the remaining input signal is masked and its distortions will typically not be audible.

It is noted that the signal adaptation unit 17 may be used independently of the second adaptive filter (12 in FIGS. 3-5). That is, the signal adaptation unit 17 may also be used in acoustic echo cancellation devices having only a single input signal and/or a single adaptive filter.

Figure 8:
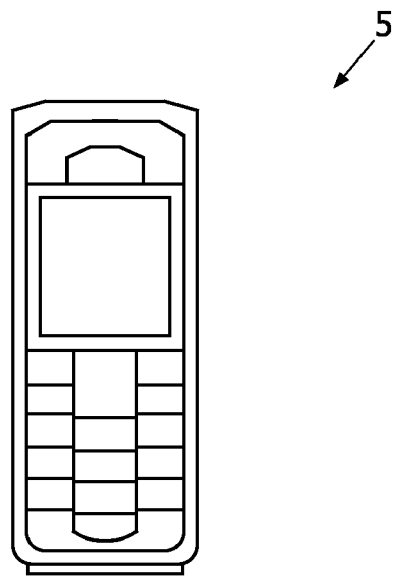
FIG. 8 schematically shows a consumer apparatus in which the present invention may be utilized.

The mobile telephone apparatus 5 schematically illustrated in FIG. 8 serves as an example of a consumer apparatus in which an acoustic echo cancellation device according to the present invention may be incorporated. Other applications of the present invention include, but are not limited to, car audio systems in which the loudspeakers render both music (originating from e.g. a radio, a CD player or an MP3 player) and speech (originating from e.g. a mobile telephone).

The present invention may be implemented in hardware and/or in software. Hardware implementations may include an application-specific integrated circuit (ASIC). Software implementations may include a software program capable of being executed on a regular or special-purpose computer.

The present invention is based upon the insight that the quality of the output signal of an acoustic echo cancellation device having multiple input signals can be significantly improved by providing at least one echo cancellation signal that is based on one of the input signals only. The present invention benefits from the further insight that the quality of the output signal of an acoustic echo cancellation device can be further improved by adding part of the input signal to the output signal.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. An acoustic echo cancellation device for canceling an echo in a microphone signal in response to a first input signal and a second input signal, the device comprising:
    a first combination unit configured to combine the first input signal with the second input signal into an aggregate input signal;
    an adaptive filter unit configured to filter the aggregate input signal so as to produce an aggregate echo cancellation signal;
    a second combination unit configured to combine the aggregate echo cancellation signal with the microphone signal so as to produce a residual signal;
    an additional filter unit configured to filter either the first input signal or the second input signal so as to produce a first partial echo cancellation signal or a second partial echo cancellation signal respectively; and
    a post-processor unit arranged for substantially suppressing remaining echo components in the residual signal,
    wherein the post-processor unit configured to use at least one of the first partial echo cancellation signal and the second partial echo cancellation signal to suppress echo components corresponding with the first input signal to a greater extent than echo components corresponding with the second input signal to selectively suppress the echo components based on the first input signal or the second input signal used as input to the additional filter unit.

2. The device according to claim 1, wherein the additional filter unit configured to filter the second input signal so as to produce the second partial echo cancellation signal, the device further comprising a third combination unit configured to combine the aggregate echo cancellation signal and the second partial echo cancellation signal so as to produce the first partial echo cancellation signal.

3. The device according to claim 2, wherein the third combination unit is integrated in the post-processor unit.

4. The device according to claim 1, wherein the additional filter unit is coupled to the adaptive filter unit so as to share filter coefficients.

5. The device according to claim 1, wherein the first signal is a speech signal and second signal is a music signal.

6. The device according to claim 5, wherein the music signal comprises a right music signal and a left music signal, and wherein the aggregate echo cancellation signal includes a right aggregate echo cancellation signal and a left aggregate echo cancellation signal.

7. The device according to claim 6, further comprising fifth combination units for producing an aggregate sum input signal and an aggregate difference input signal, adaptive filters configured to filter the aggregate sum input signal and the aggregate difference input signal respectively, and a sixth combination unit coupled to the adaptive filters for producing the echo cancellation signal, wherein the fifth combination units includes an adder for adding the right aggregate echo cancellation signal and the left aggregate echo cancellation signal to form the aggregate sum input signal, and a subtractor for subtracting the right aggregate echo cancellation signal and the left aggregate echo cancellation signal to form the difference sum input signal.

8. The device according to claim 1, further comprising a signal adaptation unit configured to receive one input signal of the first input signal and the second input signal to produce an adapted input signal, and a fourth combination unit for combining the adapted input signal and the output signal of the post-processor.

9. The device according to claim 8, wherein the signal adaptation unit comprises a delay unit, an amplifier unit and/or a filter unit.

10. The device according to claim 9, wherein the amplifier unit has a variable gain.

11. A sound processing system, comprising an acoustic echo cancellation device according to claim 1.

12. A portable consumer device comprising an acoustic echo cancellation device according to claim 1.

13. A method of canceling an echo in a microphone signal in response to a first input signal and a second input signal, the method comprising the acts of:
    combining by a combination unit the first input signal and the second input signal into an aggregate input signal;
    filtering the aggregate input signal so as to produce an aggregate echo cancellation signal;
    combining the aggregate echo cancellation signal with the microphone signal so as to produce a residual signal;
    filtering either the first input signal or the second input signal so as to produce a first partial echo cancellation signal or a second partial echo cancellation signal, respectively; and
    suppressing remaining echo components in the residual signal;
    wherein the act of suppressing remaining echo components involves utilizing at least one partial echo cancellation signal to suppress echo components corresponding with the first input signal to a greater extent than echo components corresponding with the second input signal to selectively suppress the echo components based on the first input signal or the second input signal using the second filtering act.

14. A non-transitory computer readable medium embodying a computer program comprising computer instructions when executed by a processor, configure the processor to perform the acts of:
    combining by a combination unit the first input signal and the second input signal into an aggregate input signal;
    filtering the aggregate input signal so as to produce an aggregate echo cancellation signal;
    combining the aggregate echo cancellation signal with the microphone signal so as to produce a residual signal;
    filtering either the first input signal or the second input signal so as to produce a first partial echo cancellation signal or a second partial echo cancellation signal, respectively; and
    suppressing remaining echo components in the residual signal;
    wherein the act of suppressing remaining echo components involves utilizing at least one partial echo cancellation signal to suppress echo components corresponding with the first input signal to a greater extent than echo components corresponding with the second input signal to selectively suppress the echo components based on the first input signal or the second input signal using the second filtering act.

* * * * *